(No Model.) 2 Sheets—Sheet 1.
W. E. BROCK.
VELOCIPEDE.
No. 430,107. Patented June 17, 1890.
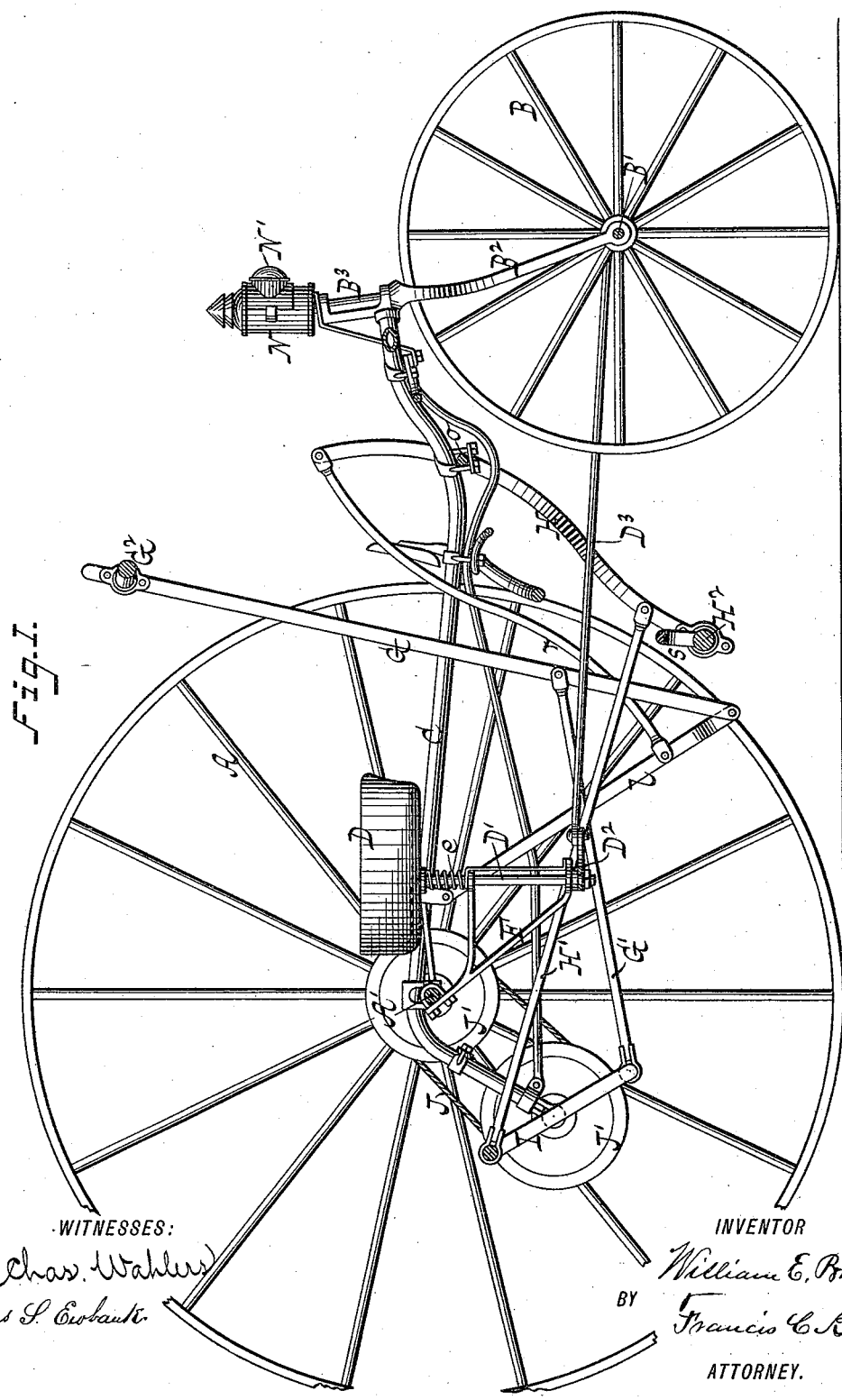
Fig. I.
WITNESSES:
Chas. Wahlers
Jas. S. Ewbank
INVENTOR
William E. Brock,
BY
Francis C. Bowen
ATTORNEY.

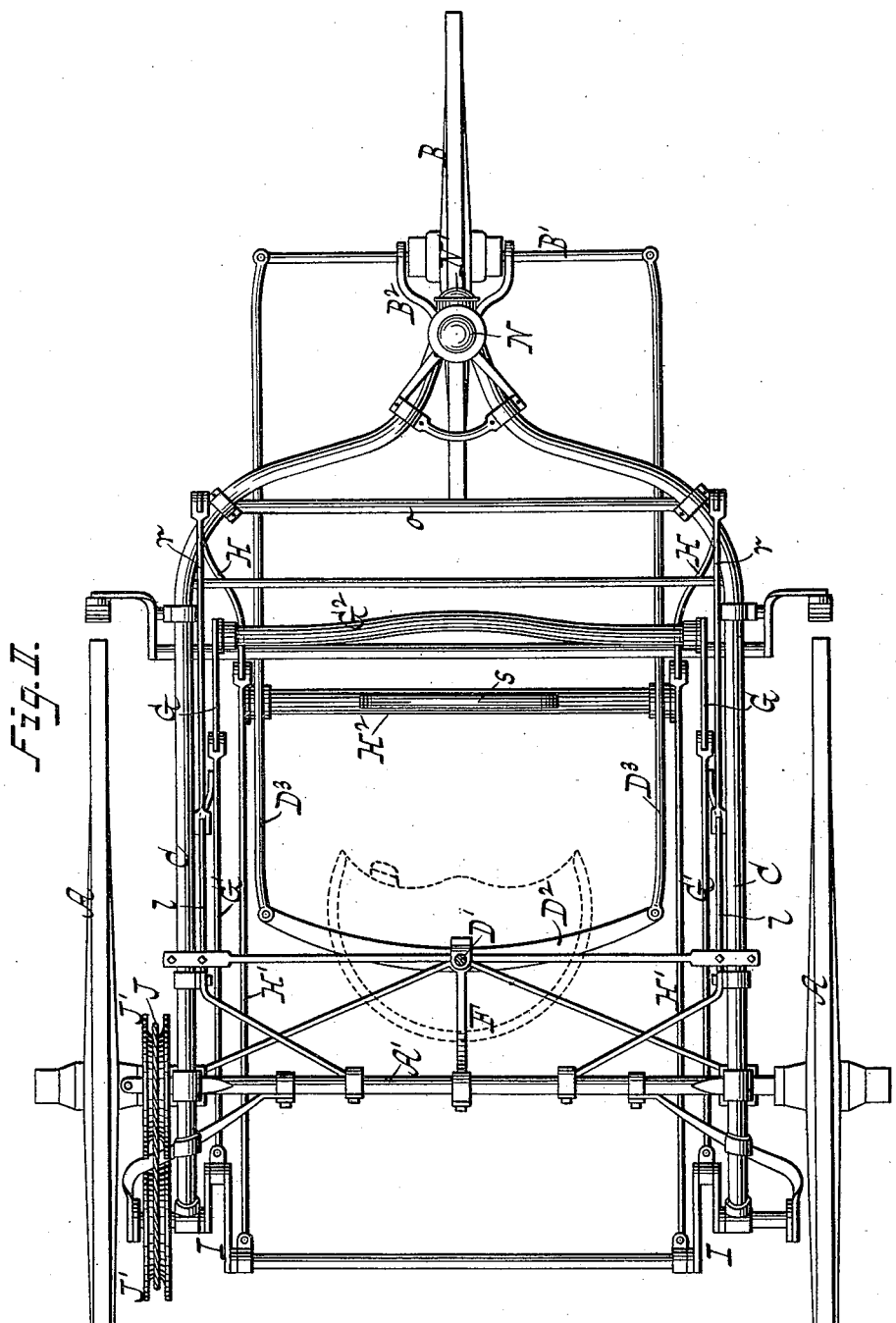

UNITED STATES PATENT OFFICE.

WILLIAM E. BROCK, OF PLAINFIELD, NEW JERSEY.

VELOCIPEDE.

SPECIFICATION forming part of Letters Patent No. 430,107, dated June 17, 1890.

Application filed October 26, 1889. Serial No. 328,339. (No model.)

*To all whom it may concern:*

Be it known that I, WILLIAM E. BROCK, a citizen of the United States, and a resident of Plainfield, in the county of Somerset and State of New Jersey, have invented certain new and useful Improvements in Velocipedes, of which the following is a specification.

My invention relates especially to three-wheel velocipedes or tricycles; and it consists of certain novel devices to permit of adjusting the middle or steering wheel through the medium of the tricycle-seat by the body of the rider, leaving both the hands and the feet free, as for driving the vehicle; also, in connection with said steering devices, of a driving mechanism having one or two pairs of vertical levers united by a horizontal bar or bars, whereby a support is afforded to the body of the rider in the act of steering by the seat, the whole being hereinafter more fully described, and illustrated in the accompanying drawings, in which—

Figure I represents a vertical longitudinal section. Fig. II represents a plan or top view, partly in section.

The letter A indicates the main wheels, and B the steering-wheel, the latter being at the front of the vehicle. A' indicates the axle or the axle-tree of said main wheels, firmly mounted on parallel bars C of the vehicle-frame, and B' indicates the axle of the steering-wheel, mounted in a post or frame B², which thus carries said wheel, and which has a pivot B³ at the upper end fitted in suitable bearings to permit it to oscillate for the required adjustment of the wheel.

The letter D indicates the tricycle-seat, which, like the steering-wheel B, occupies a position in the middle of the vehicle, and which is firmly mounted on the upper end of a vertical shaft or spindle D', on the lower end of which is likewise mounted a steering-lever D², so that this seat is adapted to oscillate on the axis of said spindle, while a corresponding motion is imparted to said lever through the spindle. Said spindle D' carrying the seat has its bearings in a hanger F, which is attached to said axle A' of the main wheels and connected by suitable braces to the side bars C, and in order to support the spindle vertically a spiral spring *e* is fitted thereon between the seat and the upper portion of said hanger, as clearly shown in Fig. I.

The axle B' of the steering-wheel is extended in opposite directions therefrom, as shown in Fig. II, and to its outer portions or ends are pivoted rods D³, which are also pivoted to the outer portions or ends of the steering-lever D², thereby connecting the steering-wheel with said lever, and thence, through the spindle D', with the seat, so that an oscillating motion of the seat is transmitted to said wheel, causing it to travel in one or the other direction. The points at which said rods D³ are pivoted to the steering-wheel axle B' and steering-lever D² are equidistant from said wheel and the spindle D', respectively, insuring a uniform action of the seat D on the steering-wheel as to both directions of motion of the seat.

It will be seen that the adjustment of the steering-wheel B may be effected entirely through the seat D by the rider's body and without the employment of either the hands or feet for that purpose, so that these limbs are left free, as for driving the vehicle, as next described.

The letter G indicates a hand-lever, and H a foot-lever, arranged at each side of the tricycle in vertical planes, and I indicates a double crank, also arranged at said points, and connected to both levers by rods G' H', said crank at one side of the vehicle being geared with one of the main wheels A, as by a band J and pulley J', so that motion may be imparted to the double cranks through said levers for driving the vehicle. The pair of hand-levers G is united by a cross-bar G², and the pair of foot-levers H is united by a corresponding bar H², said bars being arranged in horizontal planes at the upper and lower portions of the vehicle in front of the seat D, and constituting a hand-bar and foot-bar, respectively, to receive the proper limbs for driving the vehicle through said levers. The foot-bar H² is usually provided with a stirrup *s* at its middle and upper portion to better accommodate the foot of the rider. Each of the hand-levers G has its fulcrum in a pivot of a swinging arm *l*, hung to one of the side bars C, while each of the foot-levers H has its fulcrum in a shaft $o$, mounted on said bars, the swinging arms being connected to the foot-levers by rods $r$.

When the hand and foot bars $G^2 H^2$ are taken hold of for operation by the rider, an effective support is thereby afforded to the rider's body in oscillating the seat D for steering the vehicle, so that the least exertion on the part of the rider is required for that purpose, and hence either or both said bars form very useful adjuncts to the oscillating seat and concomitant parts.

The letter N indicates a lamp having a lens-front or "bull's-eye" N', the body of which lamp is firmly mounted on the steering-wheel post $B^2$, as to the top of the pivot $B^3$, causing the lamp to share the adjustment of said post together with the steering-wheel. Said lamp N forms an effective head-light, and by its arrangement maintains a fixed relation to the course or direction of the vehicle as controlled by the steering-wheel B, thereby permitting the space directly forward of the vehicle, whether traveling in a straight or circuitous course, to be always illuminated.

What I claim as new, and desire to secure by Letters Patent, is—

1. In a tricycle, an oscillating seat, a spindle carrying said seat, and a steering-wheel connected with said spindle for its adjustment by the seat, substantially as and for the purpose herein described.

2. In a tricycle, an oscillating seat, a spindle carrying said seat, a steering-lever on said spindle, a steering-wheel, and rods connecting the axle of said wheel to the steering-lever, substantially as and for the purpose herein described.

3. In a tricycle, an oscillating seat, a steering-wheel connected with said seat for its adjustment thereby, and a driving mechanism having a pair of vertical levers united by a horizontal hand-bar, substantially as and for the purpose herein described.

4. In a tricycle, an oscillating seat, a steering-wheel connected with said seat for its adjustment thereby, and a driving mechanism having a pair of vertical levers united by a horizontal foot-bar, substantially as and for the purpose herein described.

5. In a tricycle, an oscillating seat, a steering-wheel connected with said seat for its adjustment thereby, and a driving mechanism having two pairs of levers united by a horizontal hand and foot bar, respectively, substantially as and for the purpose herein described.

WILLIAM E. BROCK.

Witnesses:
FRANCIS C. BOWEN,
CHAS. WAHLERS.